United States Patent [19]

Ingersoll et al.

[11] Patent Number: 4,617,781
[45] Date of Patent: Oct. 21, 1986

[54] POLYPROPYLENE WRAP END SEALS AND PROCESS FOR MAKING SAME

[75] Inventors: Willard A. Ingersoll, Wyoming; Robert C. Norquest, Dover; Richard A. Weber, Smyrna, all of Del.

[73] Assignee: International Playtex, Inc., Stamford, Conn.

[21] Appl. No.: 680,698

[22] Filed: Dec. 12, 1984

[51] Int. Cl.[4] .................. B65B 7/06; B65B 51/16; B65B 7/18
[52] U.S. Cl. ....................................... 53/477; 53/373; 156/219; 264/339
[58] Field of Search ................. 53/482, 481, 479, 476, 53/450, 371, 373, 563, 140; 493/302, 156, 157, 158, 159; 156/98, 209, 219; 264/296, 322, 295, 339, 297.1, 297.5

[56] References Cited

U.S. PATENT DOCUMENTS

| | | |
|---|---|---|
| 2,200,971 | 5/1940 | Sonneborn et al. . |
| 2,248,471 | 7/1941 | Stroop . |
| 2,257,823 | 10/1941 | Stokes . |
| 2,322,430 | 6/1943 | Fay . |
| 2,430,995 | 11/1947 | Roos .................. 53/436 X |
| 2,882,662 | 4/1959 | Campbell .............. 53/373 X |
| 2,893,468 | 7/1959 | Fieroh . |
| 2,953,882 | 9/1960 | Tew . |
| 3,403,033 | 9/1968 | Griner . |
| 3,426,499 | 2/1969 | Paige . |
| 3,452,505 | 7/1969 | Hoag ................... 53/563 X |
| 3,522,689 | 8/1970 | Wylie et al. . |
| 3,557,525 | 1/1971 | Bauder . |
| 3,756,900 | 9/1973 | Michel ................. 53/373 X |
| 3,943,686 | 3/1976 | Crawford . |
| 3,955,338 | 5/1976 | Winzler et al. . |
| 3,982,374 | 9/1976 | Schaefer . |
| 4,019,306 | 4/1977 | Evans . |
| 4,045,946 | 9/1977 | Schaefer . |
| 4,102,111 | 7/1978 | Nack et al. . |
| 4,106,262 | 8/1978 | Aterianus . |
| 4,254,601 | 3/1981 | Prager et al. . |

FOREIGN PATENT DOCUMENTS 681504  10/1952  United Kingdom ............ 53/140

Primary Examiner—Horace M. Culver
Attorney, Agent, or Firm—Stewart J. Fried; Charles N. J. Ruggiero

[57] ABSTRACT

A voided polypropylene film tampon wrap having end seals which are formed by mechanical crimping and a process for sealing the ends of the voided polypropylene film tampon wrap by mechanical crimping. A notch is formed adjacent to each end seal but remote from the enclosed tampon. Each end seal is formed by a pair of horizontal teeth wheels each having a pitch of 50 teeth per inch. One of the pair of wheels is heated to a temperature of 125°±15°, and force is applied to at least one wheel to seal that end of the wrap by the pair of wheels.

17 Claims, 6 Drawing Figures

POLYPROPYLENE WRAP END SEALS AND PROCESS FOR MAKING SAME

BACKGROUND OF THE INVENTION

1. Field of the Invention

The present invention relates to a polypropylene wrap having particular application for tampons and, more specifically, to end seals and a process for sealing the ends of a voided polypropylene film wrap.

A tampon is enclosed in a wrap or a package prior to use to prevent the tampon from becoming soiled and also from coming into contact with moisture, either of which harmfully effects the tampon. Besides preventing the tampon from soiling and from contacting water, the wrap and its end seals need to be strong enough so as not to tear or separate during handling, yet the end seals need to tear readily to permit a user to obtain easily the tampon from within.

2. Description of the Prior Art

Paper has been used as a medium for a tampon wrap since it is pliable and readily permits sealing of its ends by mechanical crimping. However, a paper tampon wrap has drawbacks such as the paper can be torn relatively easily, water can easily damage the paper wrap and thus the enclosed tampon and paper does not seal out ambient moisture. Also, moisture effects paper, namely, moisture causes paper to seal. Therefore, a paper wrap is difficult to manufacture since the moisture in the wrap during manufacturing must be controlled or else the paper wrap may seal prematurely.

Thermoplastics have been used as the medium for a tampon wrap. However, thermoplastic materials, due to their nature, heretofore, could not readily be mechanically sealed and could not provide a mechanical crimped seal with the strength provided by the present invention. In particular, prior art thermoplastic tampon wraps have end seals which are formed by heat and pressure.

Specifically, U.S. Pat. No. 2,200,971 to Sonneborn, et al. provides a system for making, filling, and sealing packages from a thermoplastic web material in which heat and pressure are applied to form a seal. Corrugations are formed at the seal area due to the corrugations on the faces of the sealing members. This patent also provides that the end seal has beyond it a narrow unsealed margin containing a notch to facilitate opening of the package.

U.S. Pat. No. 2,257,823 to Stokes is directed to a web which may be made of "Pliofilm", Cellophane, paper or other sheet material coated with, impregnated with, or consisting of thermoplastic material. The outer seal is formed by tools under conditions of temperature, pressure, and time suitable to the thermoplastic applied to or comprised in the web to thermoplastically join marginal edges of the web.

U.S. Pat. No. 2,430,995 to Roos provides a process for sealing thermoplastic containers in which the end seals are formed by simultaneously crimping and heat sealing.

U.S. Pat. Nos. 4,102,111 to Nack, et al. and 4,106,262 to Aterianus are directed to wrapping machines which simultaneously crimp or pressurize and heat seal a thermoplastic tube.

Lastly, U.S. Pat. No. 4,254,601 to Prager et al. is directed to an assembly for forming a plurality of individual packages each made from polypropylene. The assembly includes cooperating roller members for simultaneously heat sealing, crimping, notching, and severing a tubular plastic strip which is generally polypropylene. This patent provides that the polypropylene is heated to a temperature sufficient to melt the polypropylene so as to form a heat seal. A notch $S^1$ is provided at each end to facilitate opening.

While the prior art patents include those which use heated knurled wheels for sealing by mechanically crimping and heat sealing thermoplastics, including polypropylene, wraps and also suggest that parameters such as temperature and pressure may be adjusted as desired, see U.S. Pat. No. 2,200,971 to Sonneborn, et al., page 4, col. 1, lines 41 through 50; U.S. Pat. No. 2,257,823 to Stokes, page 2, col. 1, lines 67 to col. 2, line 2, not one of the prior art patents suggests using heated knurled wheels to form only a mechanically crimped end seal as provided by the present invention.

SUMMARY OF THE INVENTION

It is an object of the present invention to provide a voided polypropylene film tampon wrap with an end seal formed by mechanical crimping.

It is a further object of the present invention to provide a process for sealing the end of a voided polypropylene film tampon wrap by mechanical crimping.

It is still a further object of the present invention to provide end seals of a voided polypropylene film wrap and a process for sealing the ends of the voided polypropylene film wrap by mechanical crimping in which a row of notches also is provided at each end.

It is yet a further object of the present invention to provide a voided polypropylene film wrap in which each end is sealed by a pair of horizontal teeth knurled wheels each wheel having a pitch of 50 teeth per inch, one of which is heated to a temperature of 125°±15° Fahrenheit, with the sealing force applied to seal each end of the voided polypropylene film wrap by the pair of knurled wheels being approximately between 800 to 4050 lbs/inch of the knurl width.

These and other objects of the present invention are provided by the preferred embodiments thereof described hereinafter.

DESCRIPTION OF THE PREFERRED EMBODIMENTS

Figure 1:
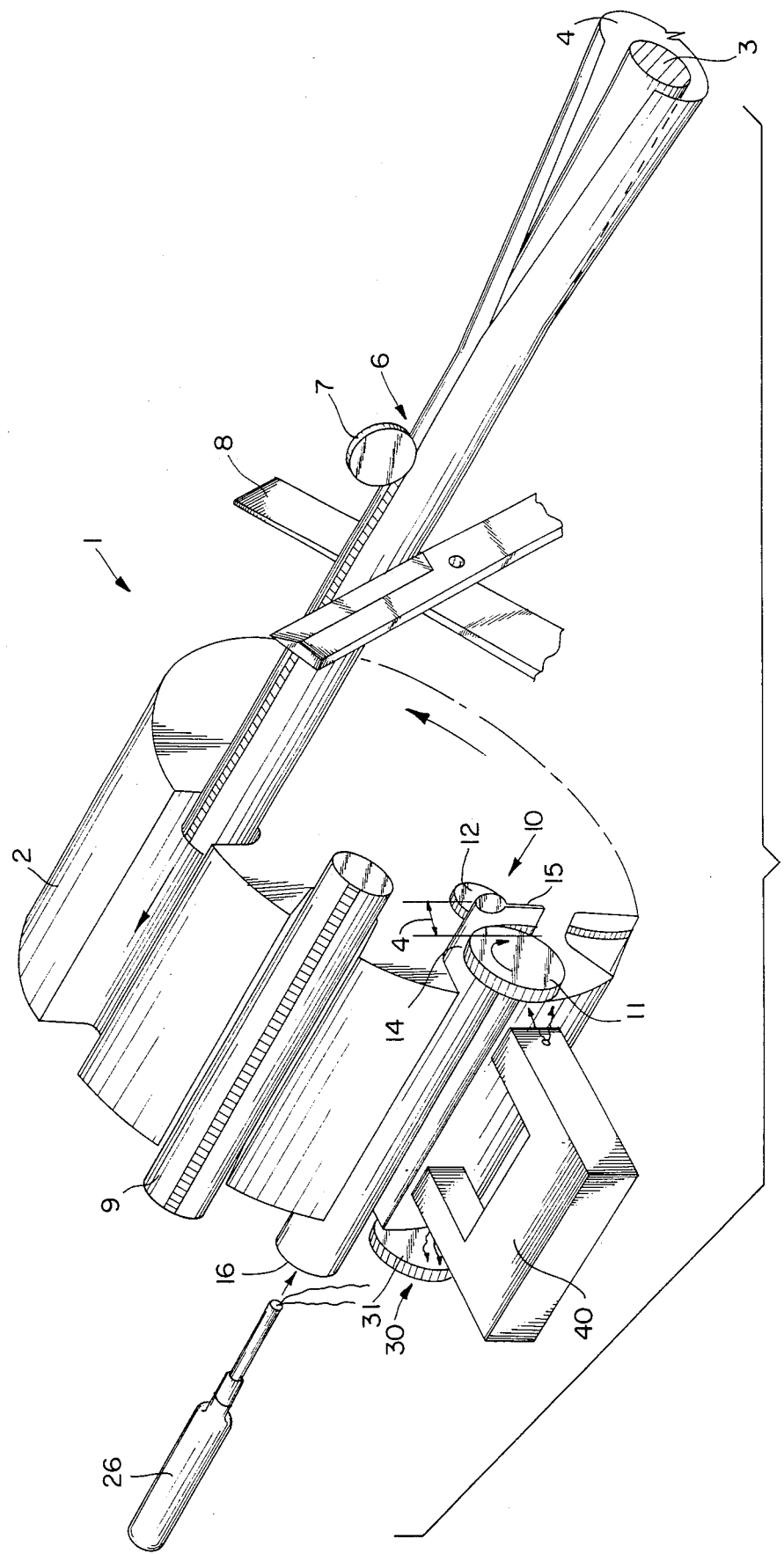
FIG. 1 is an overall view of the apparatus used to form the voided polypropylene film wrap with a tampon therein of the present invention.

Referring to the drawings and in particular to FIG. 1, a tampon wrap apparatus, generally represented by reference numeral 1, includes a rotating turret or wheel 2 which turret has traverse arcuate grooves along its periphery with each groove adapted to contain therein one tampon wrap. A flat sheet of web or wrap material, such as paper or polypropylene, is folded over a cylinder 3 having an idler wheel (not shown) thereon and forwarded by conventional means to side knurl station 6 at which the flat sheet of web material 4 is formed into a tube by the idler wheel and a knurl wheel 7 pinching together and sealing the longitudinal edges of the sheet. The tube of web material is then forwarded to scissors 8 at which time the tube is cut into discrete lengths to form individual tampon wraps 9. The lengths can vary but should be of such a length so as to contain a tampon therein as well as have sufficient length to form the end seals and notches. For example, all tampons sold by International Playtex, Inc., have a tampon wrap length of approximately 6⅛ inches±⅛ of an inch so as to contain a tampon of approximately 4½ to 5 inches. Each cut length or wrap is then forwarded to turret 2 which brings the wrap to first end seal knurl station 10. Knurl station 10 includes knurl wheel 11 and idler wheel 12 which wheels should be of the same type knurl so as to provide a good, consistent end seal on the wrap.

At station 10, knurl wheel 11 and idler wheel 12 are pressed towards each other by conventional means, such as the idler wheel is positioned on an arm (not shown) and is forcibly moved by air pressure toward the knurl wheel. The idler and knurl wheels pinch together the first or tampon plunger end 14 of the tampon wrap 9 to form a partial seal 15 yet leave open a portion of the end. A tampon 26 is then inserted into the wrap through the second or tampon barrel end 16 of the wrap and then the knurl and idler wheels close the previous open portion of first end 14. Turret 2 then moves one increment to second end seal knurl station 30 which includes a knurl wheel 31 and an idler wheel (not shown), both of which are analogous in size and dimension to that of the knurl and idler wheels of first end seal knurl station 10, to effect sealing of second end 16.

The above is a known paper tampon wrap apparatus which must be modified to make the apparatus suitable as a voided polypropylene film wrap apparatus. For instance heater unit 40 must be added to heat the knurl wheels 11, 31. Also the knurl wheels 11, 31 should have a particular teeth configuration, must have a particular pitch, and further, in conjunction with the respective idler wheel, must exert a certain amount of pressure on the voided polypropylene film wrap so as to form an end seal by mechanical crimping.

A voided film polypropylene is different than pure polypropylene. Specifically, a voided polypropylene film has air bubbles within the polypropylene film itself. By creating the air bubbles, a voided polypropylene film is less dense than pure polypropylene and, moreover, the air bubbles and less density assist the creation of a seal. Such voided polypropylene film is presently being sold under the mark of Hercules ® WT503 (Hercules is a registered trademark of Hercules Incorporated).

Figure 4:
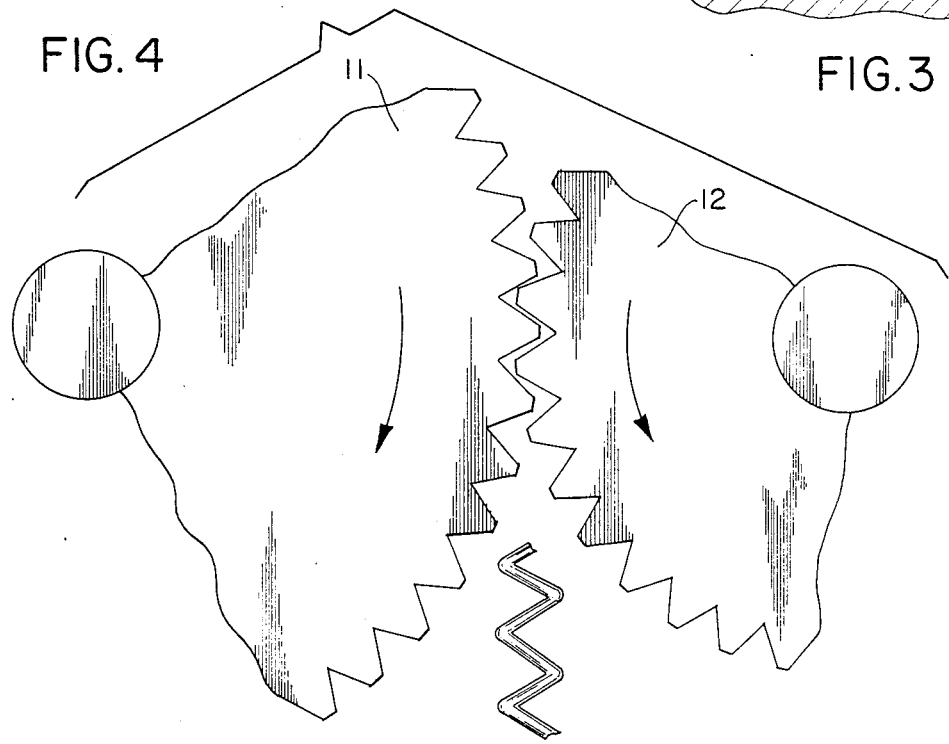
FIG. 4 is a sectional view of the knurl wheel-idler wheel arrangement but without the tampon wrap therebetween taken along lines 4—4 of FIG. 1.

Specifically, referring to the modifications to the apparatus, to seal only by mechanical crimping an end of a voided polypropylene film wrap, the knurl and idler wheels preferably have a substantially horizontal configuration as shown in FIG. 4. This type of knurl-idler wheels configuration is simpler to machine and also does not present tolerance problems with each other as does diamond and helical shaped knurl-idler wheel arrangements. Moreover, the pitch or number of teeth on a knurl (and idler) wheel is important since too few teeth do not provide a strong seal and too many teeth cause alignment or tolerance problems. The pitch should be in a range of 45 to 55 with the pitch of 50 the most preferred. It has been found that a pitch of 40 does not provide a strong enough seal and a pitch of 60 causes tolerance or alignment problems.

Figure 2:
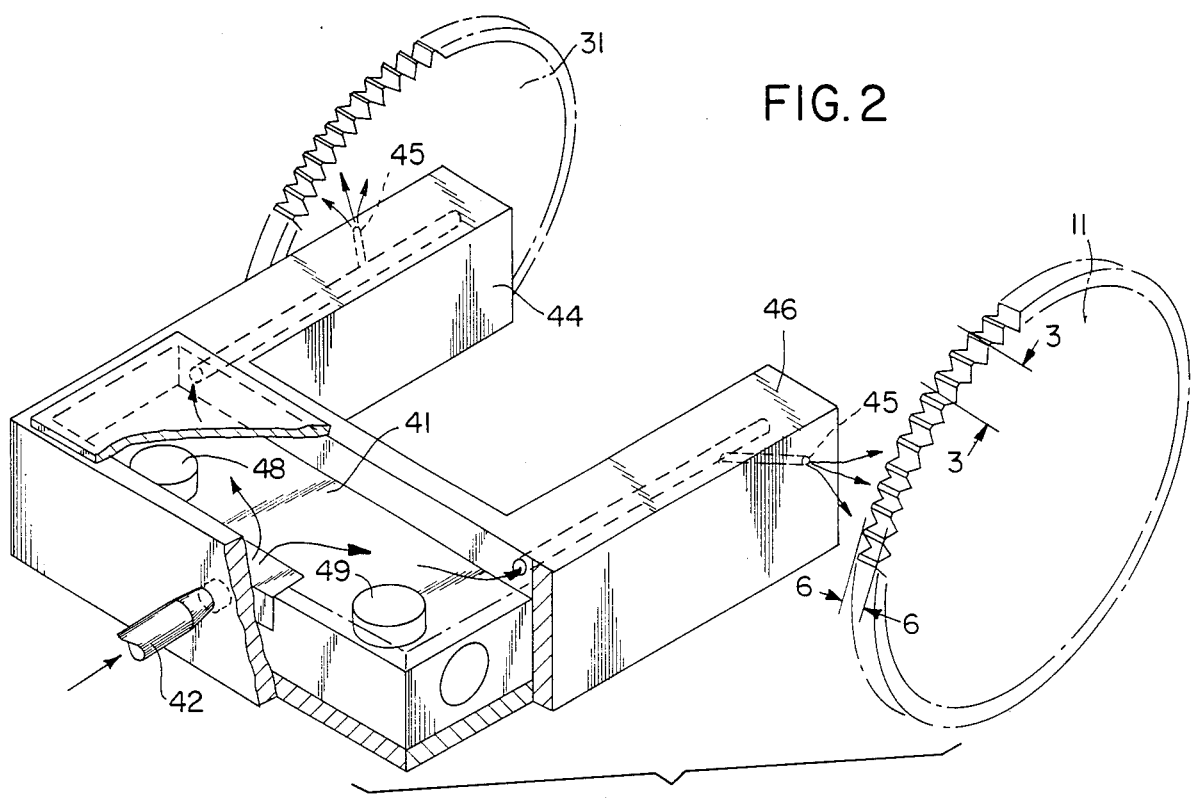
FIG. 2 is a perspective view of the heater unit shown in FIG. 1.

The diameter of each knurl wheel 11 and 31, is approximately 2½ inches so as to accommodate conveniently the 50 teeth pitch and yet conveniently fit in the wrap apparatus 1. A knurl width, which is the measurement along line 6—6 as shown in FIG. 2, must be of a width sufficient to effect a good seal, but should not be too great or else too much force would be needed to create the seal. Accordingly, the knurl width should, preferably, be between 0.080 inches to 0.100 inches. The diameter of the idler wheel should be as small as possible, however, it must be sized so as to be mechanically reliable in the confines of the overall apparatus 1. Accordingly, it has been found that the diameter of idler wheel should, preferably, be 1 inch.

Figure 3:
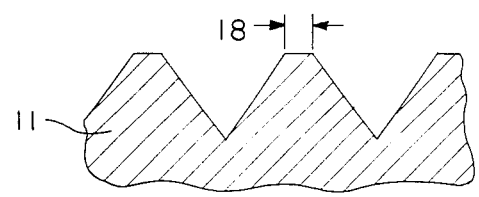
FIG. 3 is a sectional view taken along lines 3—3 of FIG. 2.

To further strengthen the end seal formed by the knurl and idler wheels, tips of the teeth of the 50 pitch horizontal configurated knurl and idler wheels should be flattened, i.e. have a flat surface 18 as shown in FIG. 3 of 0.003 to 0.005 inches. Such flat surface teeth provide a stronger end seal apparently due to the increased sealing surface area.

The force applied to press the wheels in first end seal knurl station 10 and second end seal knurl station 30, respectively, can be applied from either or both wheels, but the force is, preferably, applied only from, i.e. by the movement of, the idler wheel, while the knurl wheel remains stationery. The following is a chart of the approximate total force/inch of knurl width supplied at each end by the knurl-idler wheels to effect each end seal.

| FORCE/INCH AT STATION 10 | FORCE/INCH AT STATION 30 |
| --- | --- |
| 800 lbs. | 1350 lbs. |
| 1600 lbs. | 2700 lbs. |
| 2400 lbs. | 4050 lbs. |

Preferably, the force per/inch of knurl width at first end knurl station 10 is between approximately 800 to 1600 lbs. and the force/inch of knurl width at second end knurl station 30 is between approximately 1350 and 2700 lbs. The difference in the pounds of force between stations 10 and 30 is attributed to the fact that first end knurl station 10 seals the first end 14 of the wrap in two stages, namely seals part of the end 15 before insertion of the tampon and then seals the open or remaining portion after insertion, while second end knurl station 30 seals the second end 16 in one step. The difference may also possibly be due to mechanical differences in the wrap apparatus 1.

Unlike a paper tampon wrap apparatus, the apparatus to seal the end of the voided polypropylene film wrap is provided with a heater unit 40. The heater unit 40 is in proximity to knurl station 10 and knurl station 30 adjacent to knurl wheels 11 and 31, as shown in FIG. 1, so as to provide continuous heat to the knurl wheels 11 and 31. It has been found that the precise amount of heat increases the flexibility of the polypropylene particularly the ends thereof but the heat is such so as not to form a heat seal.

Referring to FIG. 2, heater unit 40 has a closed chamber 41 and an air inlet port 42 for supplying compressed air into the closed chamber, and also includes a pair of legs 44, 46 each of which has an air exhaust port 45. Leg 44 is positioned adjacent knurl wheel 31 while leg 46 is positioned adjacent knurl wheel 11. Significantly, the temperature in the closed air chamber needs to be in a temperature range sufficient to heat the knurl wheels to a temperature range of 110° to 140° Fahrenheit (F.) and preferably to 125° F. Further, if the knurl wheel temperature is below 110° F., it is insufficient to form a strong end seal and if the knurl wheel temperature is above 140° F., too much heat is generated so that the overall tampon machine will be heated too much. It has been found that since the heater is in close proximity to the knurl wheels 11 and 31, the temperature in the closed air chamber should be in a range of from 180° F. to 300° F. To maintain the heat in the closed air chamber in that temperature range, conventional high temperature thermostat 48 and low temperature thermostat 49 may be provided.

With the above knurl teeth pitch and dimensions especially pressure conditions, and the range of temperature for the knurl wheel, there is formed, a tampon barrel end 16 seal and a tampon plunger end 14 seal of almost equal strength.

Figure 5A:
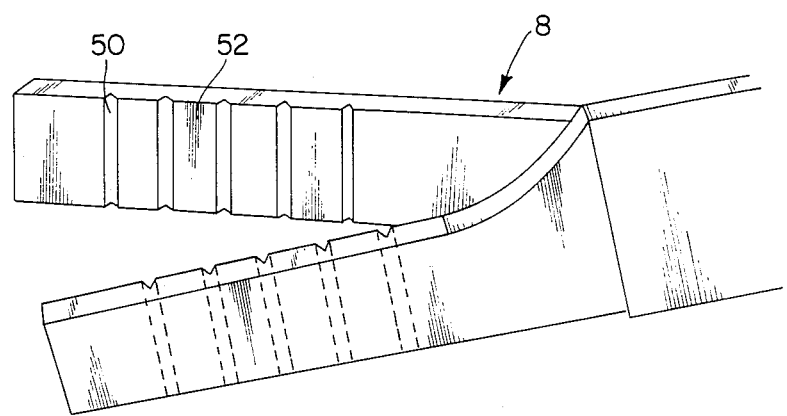
FIG. 5A is a perspective view of the scissors shown in FIG. 1.
Figure 5B:
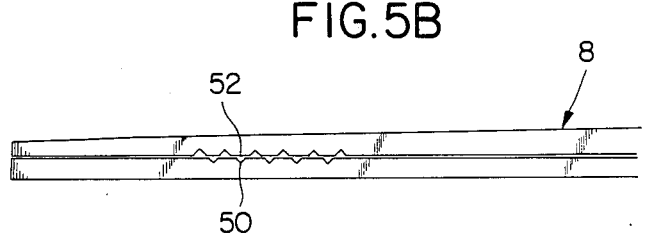
FIG. 5B is a top view of the scissors shown in FIGS. 1 and 5A.

To enable one to readily obtain the tampon from within the sealed voided polypropylene film tampon wrap, there is provided a row of alternating notches at the very extreme of each end of the wrap. These notches are formed by the scissor 8 shown in FIG. 1, the initial polypropylene sheet is cut into the individual polypropylene wraps. Specifically, as shown in FIGS. 5A and 5B, each blade of the scissors 8 has a row of traverse grooves 50. When the two blades are formed together, the grooves of one blade are adjacent to the ungrooved portion 52 of the other blade so that when the polypropylene tube is cut, the ends of each tubular wrap has a row of notches and peaks or an alternating row of notches which facilitate the tearing of the end seal from either end.

Although certain embodiments have been described and illustrated, modification may be made, as by adding, combining, subdividing parts or substituting equivalents while retaining the advantages and benefits of the present invention which is defined in the following claims.

We claim:

1. A process for sealing an end of a voided polypropylene film wrap comprising the steps of:
   (a) inserting said end of said polypropylene wrap between a 50 pitch knurl wheel and a 50 pitch idler wheel;
   (b) pressing at least one of said knurl and idler wheels against said polypropylene wrap and said other wheel so as to effect a mechanically crimped seal; and
   (c) heating said knurl wheel prior to and during said pressing step (b) to a temperature from 110° F. to 140° F. in order to increase the flexibility of said polypropylene wrap but not form a heat seal.

2. The process according to claim 1, wherein only said idler wheel is pressed during said pressing step (b).

3. The process according to claim 1, wherein each tooth of said knurl and idler wheels has a flat tip portion of 0.003 to 0.005 inches to effect a stronger end seal.

4. The process according to claim 1, wherein said knurl wheel should have a knurl width of approximately 0.08 to 0.10 inches.

5. The process according to claim 1, wherein said pressing step (b) exerts a total force/inch of knurl width of approximately 800 to 4050 lbs. on said end to effect a mechanical crimped seal.

6. A process for forming a voided polypropylene film wrap adapted to receive and have sealed therein an article, said process comprising the steps of:
   (a) sealing a sheet of voided polypropylene film along its longitudinal edges to form a tube;
   (b) cutting said tube into an individual wrap so that each wrap has an alternative row of notches at each end;
   (c) inserting a first end of said wrap between a 50 pitch knurl wheel and a 50 pitch idler wheel;
   (d) pressing at least one of said knurl and idler wheels against said first end of said wrap and said other wheel so as to effect a mechanically crimped seal;
   (e) and (f) repeating steps (c) and (d), respectively, for a second end of said wrap; and
   (g) heating said knurl wheel prior to and during said pressing steps to a temperature from 110° F. to 140° F. in order to increase the flexibility of the polypropylene wrap but not form a heat seal.

7. The process according to claim 6, further including the steps of introducing each of said individual wraps into a transverse arcuate groove in a rotating turret sealing device and rotating said turret sealing device to a first sealing station where a first end of said wrap is aligned between a 50 pitch knurl wheel and a 50 pitch idler wheel.

8. The process according to claim 7, wherein said pressing step at said first sealing station comprises the steps of initially pressing said knurl and idler wheels against said first end of said wrap in order to effect a partial mechanical crimp seal along said first end, inserting said article into said wrap through a second end, and thereupon subsequently pressing said knurl and idler wheels against said first end of said wrap in order to complete the mechanical crimp seal along said first end.

9. The process according to claim 8, further including the step of rotating said turret to a second sealing station where said second end of said wrap is aligned between a 50 pitch knurl wheel and a 50 pitch idler wheel.

10. The process according to claim 6, wherein said article comprises a tampon.

11. The process according to claim 6, wherein said pressing step (d) exerts a total force/inch of knurl width of 800 to 2400 lbs. on said first end to effect a mechanical crimped seal.

12. The process according to claim 6, wherein said pressing step (g) exerts a total force/inch of knurl width of 1350 to 4050 lbs. on said second end to effect a mechanical crimped seal.

13. Apparatus for use in inserting and sealing an article within a voided polypropylene film wrap comprising:
   (a) means for forming a sheet of voided polypropylene film into a tube;
   (b) means for cutting said tube into individual wraps so that each wrap has an alternative row of notches at each end;
   (c) a rotating turret sealing device including a plurality of transverse acruate grooves adapted to receive each wrap;
   (d) means for introducing at least one of said individual wraps into at least one of said transverse acruate grooves;
   (d) means for rotating said turret sealing device such that said at least one of said transverse arcuate grooves is positioned relative to a first sealing station which includes a heated knurl wheel and an idler wheel for sealing at least one end of said at least one wrap;

(e) means for sealing said at least one end;

(f) means for inserting said article into a second end of said at least one wrap;

(g) means for further rotating said turret sealing device such that said at least one transverse arcuate groove is positioned relative to a second sealing stating which includes a heated knurl wheel and an idler wheel for sealing said second end; and (h) means for sealing said second end.

14. The apparatus of claim 13, wherein the pitch of the knurl and idler wheels in said first and second sealing stations is between about 45 and about 55.

15. The apparatus of claim 13, wherein the width of the knurl wheels in said first and second sealing stations is between about 0.080 inches and about 0.100 inches and wherein the tips of the teeth of the knurl and idler wheels in the first and second sealing stations include a flat surface of between about 0.003 and about 0.005 inches.

16. The apparatus of claim 15, wherein the knurl and idler wheels at the first sealing station are adapted to be pressed together with a force between about 800 and about 1600 lbs and wherein the knurl and idler wheels at the second sealing station are adapted to be pressed together with a force between about 1350 and about 2700 lbs.

17. The apparatus of claim 13, wherein said knurl wheels are heated to a temperature between about 110° F. and about 140° F.

* * * * *